Patented July 23, 1935

2,009,144

UNITED STATES PATENT OFFICE 2,009,144

SUBSTITUTED AMIDES OF ALIPHATIC-AROMATIC ACIDS

Karl Miescher and Werner Meisel, Riehen, near Basel, and Karl Hoffmann, Basel, Switzerland, assignors to "Society of Chemical Industry in Basle", Basel, Switzerland No Drawing. Application September 6, 1934, Serial No. 742,984. In Switzerland September 13, 1933

7 Claims. (Cl. 260—124)

This invention relates to the manufacture of amides of aliphatic-aromatic acids in which there is an amine residue as a substituent at the amide-nitrogen. These new amides have valuable therapeutic properties, and approximate the atropine in value.

The new amides may be made either by causing an aliphatic-aromatic acid, or a substitution product, derivative or equivalent thereof, to react with a polyamine having at least one free amino-hydrogen, or by causing an aliphatic-aromatic amide, or a substitution product thereof, to react with a reactive ester of an amino-alcohol.

As acid components there may be used, for instance, phenylacetic acid, mandelic acid, tropic acid, diphenylacetic acid, diphenyloxyacetic acid, hydrocinnamic acid, phenyllactic acid and also aliphatic-aromatic acids containing alkyl, alkylene, halogen, aryloxy, alkoxy or like groups as substituents. At the amide-nitrogen there may be any amine residue and also hydrogen or a neutral residue, such as alkyl, as substituents.

On account of their amide structure the new products are distinguished by a greater stability from the known members of the atropine series containing merely an ester group. By converting the new bases into their quarternary ammonium compounds by addition of alkylhalide, benzylhalide, methylsulfate or the like, their action is frequently increased.

The following examples illustrate the invention, the parts being by weight:—

Example 1

40 parts of α,α,α-diphenyloxyacetic acid-methyl ester and 20 parts of 2-diethylamino-ethylamine are boiled together for 2 hours in a reflux apparatus, and the product of the reaction is dissolved in ether. The new base is extracted by means of dilute acid and precipitated from the aqueous solution by addition of alkali. The α,α,α-diphenyl-oxy-acetic acid-2-diethylamino-ethylamide of the formula

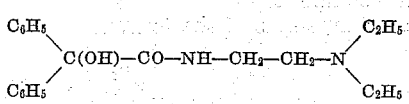

separates first in the form of an oil which, however, soon solidifies. When recrystallized from alcohol it melts at 104–105° C (corr.). The melting point of the colorless hydrochloride is 178–179° C. (corr.). With dimethylsulfate and methyliodide crystalline addition products are produced; the melting point of the methoiodide being 194–195° C. (corr.).

Example 2

23 parts of diphenyl acetic acid and 40 parts of thionylchloride are boiled in a reflux apparatus for 1 hour. The mass is allowed to cool and the excess of thionylchloride evaporated in a vacuum. The residue is dissolved in absolute benzene and carefully mixed with a benzene solution of 9 parts of 2-dimethylaminoethylamine, while cooling with ice. After the reaction is complete the solution is shaken with dilute hydrochloric acid, the aqueous portion is mixed with sodium carbonate, and the white precipitate of the new base thus formed is filtered by suction. The diphenylacetic acid-2-dimethylamino-ethylamide of the formula

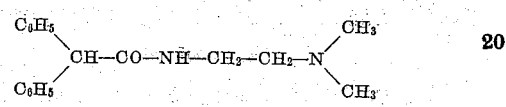

can be recrystallized from acetic ester and melts at 108–109° C.

Example 3

21.4 parts of phenylacetyl chloride are diluted with 130 parts of benzene and the solution is boiled in a reflux apparatus with 32.1 parts of 2-diethylamino-ethylamine for 1½ hours. The hydrochloride of the diamine is washed out with water. When the benzene solution is evaporated to dryness the phenylacetyl-2-diethyl-ethylenediamide of the formula

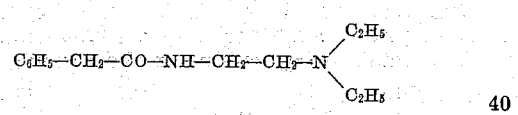

remains in the form of an oil. In a high vacuum it can be distilled, the boiling point being 121° C. under 0.03 mm. pressure.

Example 4

21 parts of diphenylacetic acid amide and 4 parts of sodium amide are heated in 200 parts of toluene for 5 hours in a reflux apparatus. The calculated quantity of chloroethyl-diethylamine is slowly added to the mass and the whole is further heated until the reaction is complete.

The cold reaction mass is introduced in dilute hydrochloric acid and the new base separated from the filtered aqueous solution in the usual manner. The diphenylacetic acid-2-diethyl-amino-ethylamide of the formula

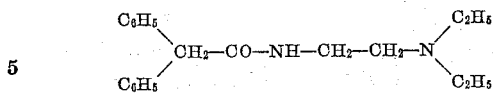

forms colorless crystals of melting point 94° C. Its hydrochloride melts at 144½° C., its metho-iodide at 167–168° C. and its metho-chloride at 98–99° C.

The same base may be also obtained for example by heating the diphenylacetic acid with 2-diethylamino-ethylamine to 200° C.

According to either of the methods described in this example there may likewise be obtained the diphenyl-acetic acid-2-di-n-propylamino-ethylamide and diphenyl-acetic acid-2-n-butyl-amino-ethylamide, both forming bases soluble in organic solvents and in mineral acids.

Example 5

A benzene solution of 26 parts of 3-diethyl-amino-propylamine is allowed to react with a solution of 23 parts of diphenylacetic acid chloride in benzene. After the reaction is complete the solution is shaken with dilute hydrochloric acid and the diphenlyacetic acid-3-diethylamino-propylamide of the formula

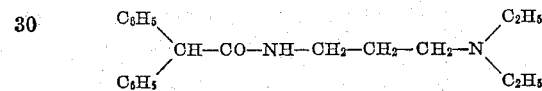

separated from the aqueous solution by addition of caustic soda solution. The new base boils at 175–180° C. under a pressure of 0.01 mm., and melts at 89½–91° C., the hydrochloride thereof melts at 125½–126½° C., its metho-iodide at 167–169° C. and its metho-chloride at 124½–125½° C.

Example 6

25.5 parts of α,α-diphenyl-α-acetoxy-acetyl-chloride are allowed to act, while cooling, on 27.9 parts of 2,2-dimethyl-3-diethylamino-propylamine in presence of petroleum ether; the whole is then boiled for 1 hour in a reflux apparatus, cooled, washed with water and then shaken with dilute acid to extract the α,α-diphenyl-α-acetoxy-acetic acid-2,2-dimethyl-3-diethylamino-propyl-amide. The aqueous solution is mixed with sodium carbonate and the separated acetylated base is saponified in alcoholic solution with the molecular proportion of concentrated caustic potash solution. The alcohol is distilled, the residue extracted with ether and the ethereal solution separated. When distilled in a vacuum the α,α-diphenyl-α-oxy-acetic acid-2,2-dimethyl-3-diethylamino-propylamide of the formula

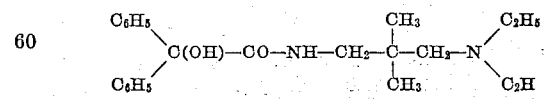

distils at 178–179° C. under 0.05 mm. pressure, and solidifies after treatment with petroleum ether. The new base melts at 78–79° C. It is freely soluble in acid.

Example 7

13 parts of acetyltropic acid-chloride are caused to react in benzene solution with 15 parts of 2-diethylamino-ethylamine. The mass is then shaken with dilute hydrochloric acid, the aqueous layer is separated and the base is precipitated by means of potassium carbonate. It is extracted with ether and the ether solution dried with potassium carbonate is evaporated. The acetyl-tropic acid-2-diethylamino-ethylamide is obtained in the form of a light yellow oil. When boiling the same with dilute hydrochloric acid, the acetyl-group is split off and the tropic acid-2-diethylamino-ethylamide of the formula

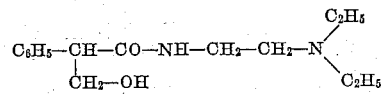

is obtained in the form of an oil which crystallizes with one mole of crystal water, and has a melting point of 47–48° C.

Example 8

A benzene solution of 20.6 parts of N-2-diethyl-aminoethyl-N-benzylamine is allowed to react with a solution of 11.5 parts of diphenylacetic acid chloride in benzene. When the reaction is complete the solution is shaken with dilute hydrochloric acid, and the aqueous solution is extracted with ether after addition of potassium carbonate solution. The ether solution dried with potassium carbonate is evaporated, and the residue fractionated in a vacuum. The diphenylacetic acid-N-2-diethylamino-ethyl-N-benzylamide of the formula

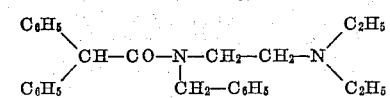

boils at 187° C. under a pressure of 0.015 mm.

In manner similar to that described in the foregoing examples there may be made, for instance, diphenylene-oxy-acetic acid-2-diethylamino-ethylamide of melting point 125–126° C., and yielding a hydrochloride melting at 215–217° C.; acetylbenzil acid-2-diethylamino-ethylamide, of melting point 72–73° C.; α-phenyl-α-methoxy-acetic acid-2-diethylamino-ethylamide, of boiling point 160–162° C., under 2 mm. pressure; α-phenyl-α,α-diethylacetic acid-2-ethylamino-ethylamide of boiling point 124–126° C. under 0.09 mm. pressure and forming the hydrochloride melting at 168–169° C.; mandelic acid-2-diethyl-amino-ethylamide of melting point 79–80° C. and yielding a hydrochloride melting at 161–162° C.; β-phenylpropionic acid-2-diethylamino-ethyl-amide of boiling point 126–127° C. under 0.03 mm. pressure; phenylacetyl-2-piperidino-ethylamide of melting point 57° C. and boiling point 122° C. under 0.015 mm. pressure and forming a metho-iodide melting at 94–95° C.; triphenyl-acetyl-2-diethylamino-ethylamide of melting point 162–163° C.; diphenyl acetyl-N-2-diethylamino-ethyl-N-ethylamide of boiling point 158–160° C. under 0.01 mm. pressure; diphenyl acetyl-2-piperidino-ethylamide of melting point 78–80° C. and diphenyl acetyl-bis-(2-piperidino-ethyl)-amide of melting point 77–78° C.

What we claim is:—

1. The compounds of the formula

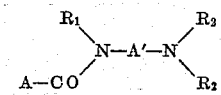

wherein A means an aromatically substituted aliphatic radical, A' represents an alkylene radical containing at least two carbon atoms, R₁ stands for hydrogen, alkyl or phenylalkyl and R₂ stands for alkyl, both $R_2$ may also stand for an alkylene chain to form a piperidine ring, which products are useful therapeutics, forming salts soluble in water.

2. The compounds of the formula

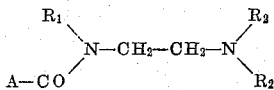

wherein A means an aromatically substituted aliphatic radical, $R_1$ stands for hydrogen, alkyl or phenylalkyl and $R_2$ stands for alkyl, both $R_2$ may also stand for an alkylene chain to form a piperidine ring, which products are useful therapeutics, forming salts soluble in water.

3. The compounds of the formula

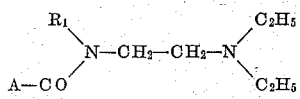

wherein A means an aromatically substituted aliphatic radical and $R_1$ stands for hydrogen, alkyl or phenylalkyl, which products are useful therapeutics, forming salts soluble in water.

4. The compounds of the formula

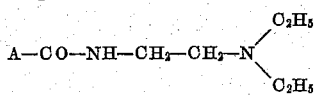

wherein A means an aromatically substituted aliphatic radical, which products are useful therapeutics, forming salts soluble in water.

5. The compound of the formula

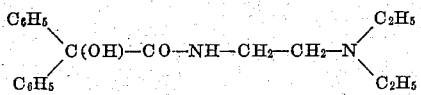

6. The compound of the formula

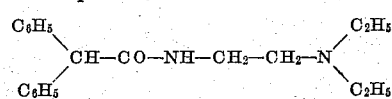

7. The compound of the formula

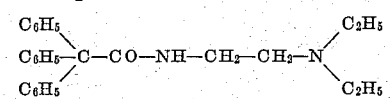

KARL MIESCHER.
WERNER MEISEL.
KARL HOFFMANN.